(Specimens.)
J. J. McTIGHE.
MANUFACTURING CARBON BLACK.
No. 346,169. Patented July 27, 1886.
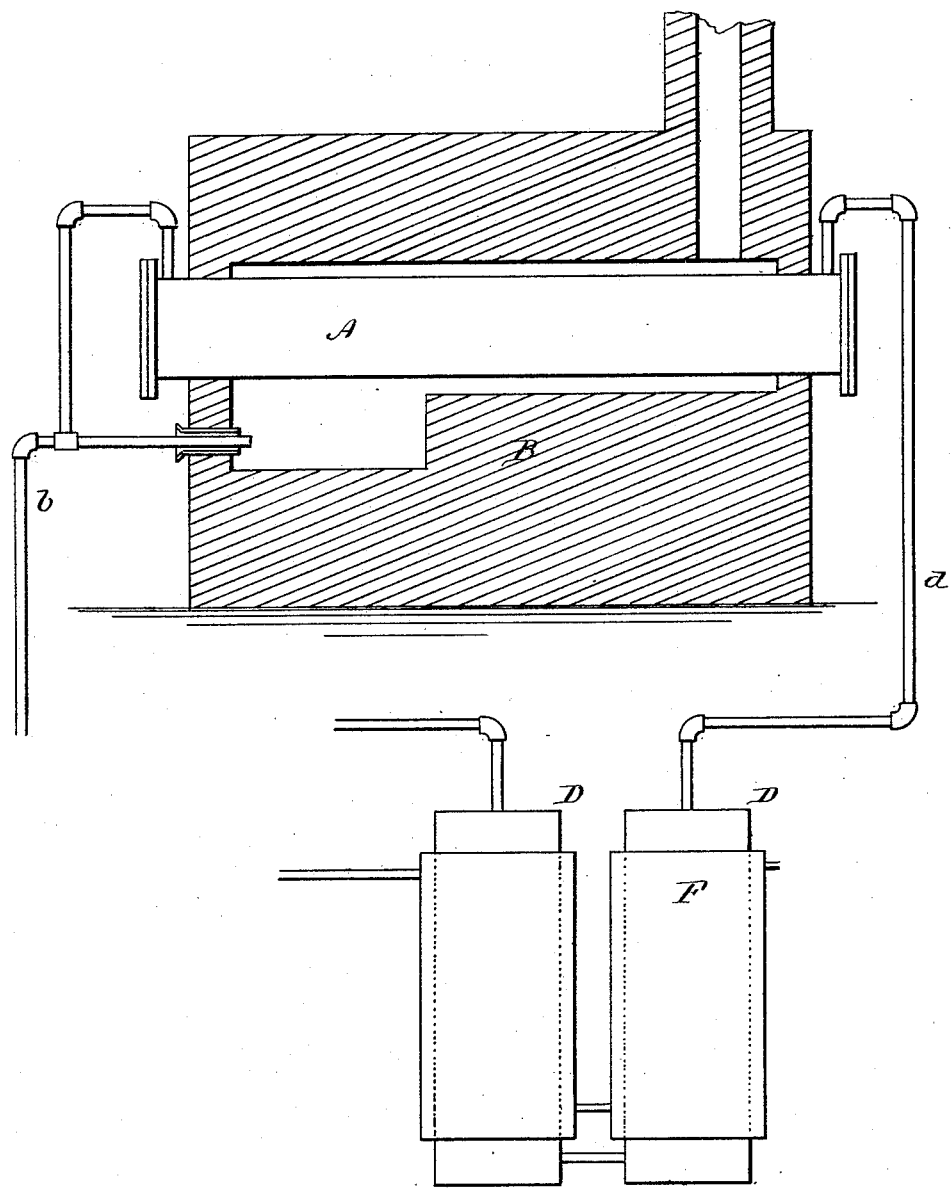
Witnesses
Jos. B. Connolly
A. A. Connolly
James J. McTighe
Inventor
By
Connolly Bros & McTighe
Attys.

UNITED STATES PATENT OFFICE.

JAMES J. McTIGHE, OF PITTSBURG, PENNSYLVANIA.

MANUFACTURING CARBON-BLACK.

SPECIFICATION forming part of Letters Patent No. 346,169, dated July 27, 1886.

Application filed December 7, 1883. Serial No. 113,834. (Specimens.)

*To all whom it may concern:*

Be it known that I, JAMES J. McTIGHE, of Pittsburg, in the county of Allegheny and State of Pennsylvania, have invented certain new and useful Improvements in the Manufacture of Carbon-Black; and I do hereby declare that the following is a full, clear, and exact description thereof, which will enable others skilled in the art to which it appertains to make and use the same, reference being had to the accompanying drawing, which form a part of this specification, in which is illustrated an elevation, partly in section, of the apparatus embodying my invention.

This invention has relation to the manufacture of that form of solid carbon known as "lamp-black" or "carbon-black," and which is distinguished by well-known characteristics from other amorphous forms of carbon, such as coke or graphite.

In an application filed by me of even date herewith I have described and claimed an apparatus for producing carbon-black by decomposing hydrocarbon vapors and condensing the liberated carbon in a close vessel under the influence of cold.

My present invention consists in and is confined to, first, the process or method of producing carbon-black by decomposing hydrocarbon vapor, cooling the same, and precipitating the liberated carbon in a closed vessel or condensing-tank; and, secondly, the production of carbon-black of a flocculent character possessing the quality of extreme unctuousness or oiliness, and susceptible of being freely mixed with oils and other liquids, for which it possesses a strong affinity.

Having in the application above referred to described in detail the apparatus for carrying out my process, it is deemed a sufficient specification to herein state that as a process my invention consists in decomposing the hydrocarbon vapor in a suitable retort by means of intense heat, as distinguished from a combustion or burning of the same in atmospheric air or oxygen, and then leading the separated or nascent products to a closed vessel, which, being kept cool, causes a condensation of the carbon into the form of carbon-black.

In the accompanying drawing, which shows, partly in vertical section and partly in elevation, a simple form of apparatus suitable for carrying out the invention, A designates a retort, and *b* a gas-supply pipe. B is a furnace for heating the retort, and D is a condensing-chamber communicating with the retort by a pipe, *d*, and surrounded by a water-jacket, F, for cooling purposes. Decomposition takes place in the retort under the action of intense heat externally applied, and the nascent products escape therefrom into the condensing-tank D, where precipitation of the carbon immediately occurs.

While the carbon-black which I have obtained has been that yielded from the decomposition of natural gas, and to that source may owe its peculiar properties, I do not wish to be confined to the production solely of any particular kind of carbon-black, nor to the production of carbon-black from natural gas.

The carbon-black which I have obtained is very different in appearance from that obtained under ordinary processes, and is prominently distinguishable therefrom by being of a bluish grayness, not intensely black, and by being unctuous to the touch, suggesting the presence of oil.

The purpose for which I especially intend using this carbon-black is in the manufacture of coke or carbon pencils or filaments for electric lighting under conditions which will be explained in other applications.

What I claim as my invention is—

1. The process of producing carbon-black from hydrocarbon vapor, consisting in subjecting said vapor to the action of intense heat without combustion of said vapor, thereby disassociating the gases, and then subjecting the decomposed vapors to the influence of cold, whereby the carbon-black is deposited without combustion, substantially as described.

2. As a new product, carbon-black of a normally unctuous or oily character, substantially as described.

In testimony that I claim the foregoing as my own I have hereto affixed my signature in presence of two witnesses.

JAMES J. McTIGHE.

Witnesses:
D. E. DAVIS,
T. J. McTIGHE.